(12) United States Patent
Shin et al.

(10) Patent No.: US 9,262,401 B2
(45) Date of Patent: Feb. 16, 2016

(54) METHOD AND SYSTEM FOR PROVIDING REPRESENTATIVE PHRASE

(75) Inventors: Jae Seung Shin, Seongnam-si (KR); Young Sub Park, Seongnam-si (KR); Jae Keol Choi, Seongnam-si (KR); Won Sook Noh, Seoul (KR)

(73) Assignee: NHN CORPORATION, Seongnam-Si (KR)

( * ) Notice: Subject to any disclaimer, the term of this patent is extended or adjusted under 35 U.S.C. 154(b) by 191 days.

(21) Appl. No.: 13/176,375

(22) Filed: Jul. 5, 2011

(65) Prior Publication Data

US 2012/0004904 A1 Jan. 5, 2012

(30) Foreign Application Priority Data

Jul. 5, 2010 (KR) .................. 10-2010-0064432

(51) Int. Cl.
*G06F 17/27* (2006.01)
*G06F 17/30* (2006.01)

(52) U.S. Cl.
CPC ........ *G06F 17/277* (2013.01); *G06F 17/30705* (2013.01)

(58) Field of Classification Search
CPC .. G06F 17/27; G06F 17/30705; G06F 17/277
USPC ....................................................... 704/1–10
See application file for complete search history.

(56) References Cited

U.S. PATENT DOCUMENTS

| | | | |
|---|---|---|---|
| 6,418,431 B1 * | 7/2002 | Mahajan | G06F 17/30687 |
| 6,470,307 B1 * | 10/2002 | Turney | G06F 17/3061 |
| | | | 704/9 |
| 6,675,159 B1 * | 1/2004 | Lin | G06F 17/2705 |
| 7,031,908 B1 * | 4/2006 | Huang | G10L 15/1815 |
| | | | 704/9 |
| 7,117,437 B2 * | 10/2006 | Chen | 704/257 |
| 8,073,851 B2 | 12/2011 | Takata et al. | |
| 2004/0122657 A1 * | 6/2004 | Brants | G06F 17/2229 |
| | | | 704/9 |
| 2005/0289599 A1 | 12/2005 | Matsuura et al. | |
| 2006/0282856 A1 | 12/2006 | Errico et al. | |

(Continued)

FOREIGN PATENT DOCUMENTS

| | | |
|---|---|---|
| JP | 2002-320159 | 10/2002 |
| JP | 2004-355483 | 12/2004 |

(Continued)

OTHER PUBLICATIONS

Mahajan et al., Mar. 1999, Improved Topic-Dependent Language Modeling using Information Retrieval Techniques, Proceedings IEEE International Conference on Acoustics, Speech, and Signal Processing (ICASSP), vol. 1, pp. 541-544.*

(Continued)

*Primary Examiner* — Pierre-Louis Desir
*Assistant Examiner* — Seong-Ah A. Shin
(74) *Attorney, Agent, or Firm* — Harness, Dickey & Pierce, PLC

(57) ABSTRACT

A method and system for providing a representative phrase corresponding to a real time (current time) popular keyword. The method and system may extend a representative criterion word, determined by analyzing morphemes of words in documents grouped into a cluster, and may combine the extended representative criterion word and the popular keyword, thereby providing the representative phrases. The method and system may display the popular keyword and the representative phrases on a web page, or the like.

22 Claims, 5 Drawing Sheets

(56) References Cited

U.S. PATENT DOCUMENTS

| | | | | |
|---|---|---|---|---|
| 2008/0319746 | A1* | 12/2008 | Okamoto | G06F 17/30719 704/245 |
| 2010/0017390 | A1* | 1/2010 | Yamasaki | G06F 17/30646 707/E17.008 |
| 2010/0228693 | A1* | 9/2010 | Dawson | G06F 17/2705 706/12 |
| 2011/0004462 | A1* | 1/2011 | Houghton | G10L 15/183 704/9 |
| 2011/0218864 | A1 | 9/2011 | Pentz et al. | |
| 2012/0010874 | A1* | 1/2012 | Shin | H04N 21/8405 704/9 |
| 2012/0078907 | A1* | 3/2012 | Kokubu | G06F 17/3064 707/737 |

FOREIGN PATENT DOCUMENTS

| | | |
|---|---|---|
| JP | 2006-139718 | 6/2006 |
| JP | 4462014 | 6/2006 |
| JP | 2007-241568 | 9/2007 |
| JP | 2008-040636 A | 2/2008 |
| JP | 2009-003888 | 1/2009 |
| JP | 4342575 | 1/2009 |
| JP | 2009-134700 | 6/2009 |
| KR | 10-2004-0029895 | 4/2004 |
| KR | 10-2007-0051227 | 5/2007 |
| KR | 10-2007-0067058 | 6/2007 |

OTHER PUBLICATIONS

Frantzi et al., 1996, COLING '96 Proceedings of the 16th conference on Computational linguistics—vol. 1, pp. 41-46.*

Non-Final Office Action issued on May 2, 2013 in U.S. Appl. No. 13/177,149.

Japanese Office Action dated Nov. 4, 2014 in corresponding Japanese Application No. 2011-143991.

U.S. Appl. No. 13/177,149, filed Jul. 6, 2011.

* cited by examiner

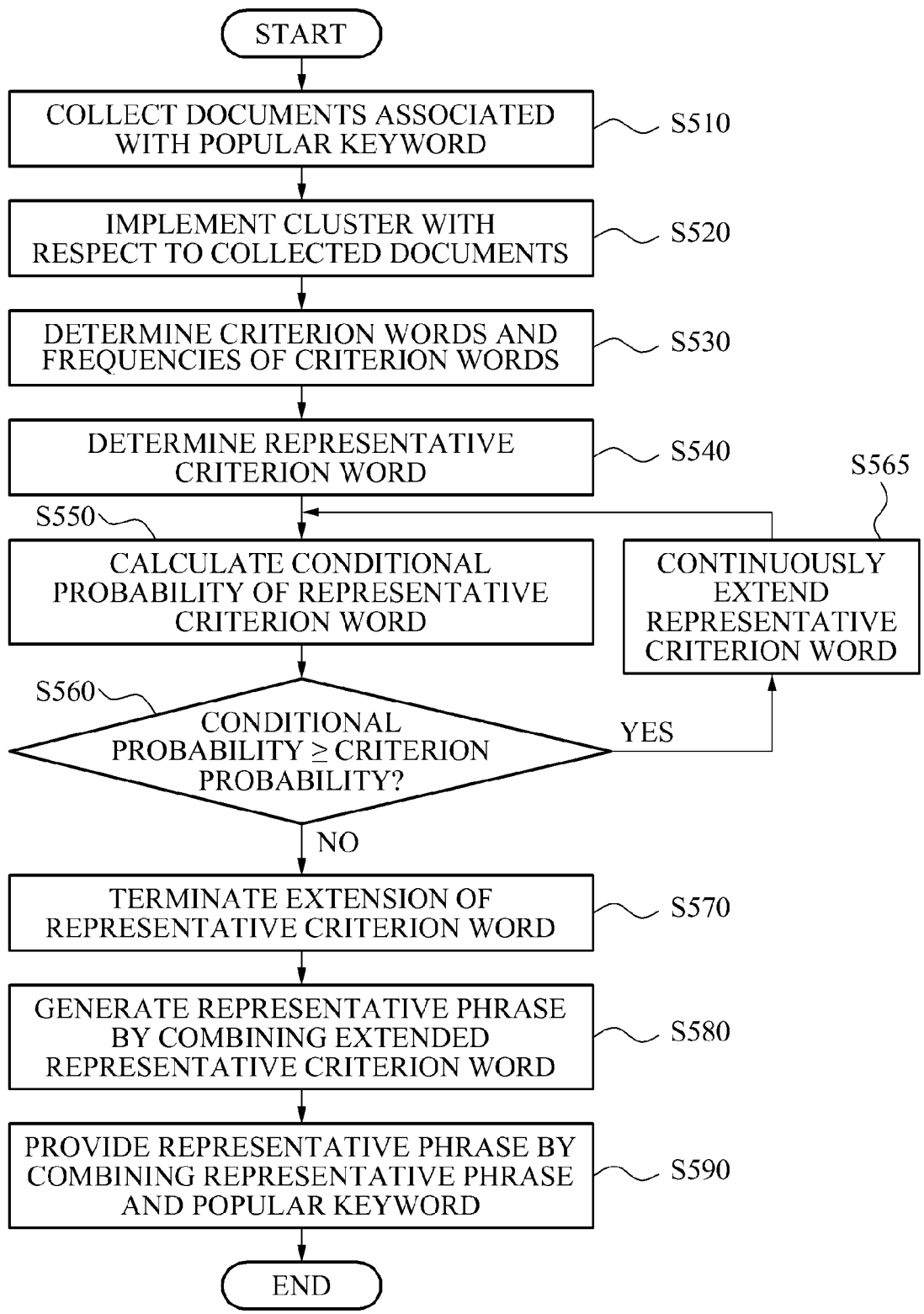

METHOD AND SYSTEM FOR PROVIDING REPRESENTATIVE PHRASE

CROSS-REFERENCE TO RELATED APPLICATION

This application claims priority from and the benefit of Korean Patent Application No. 10-2010-0064432, filed on Jul. 5, 2010, which is hereby incorporated by reference for all purposes as if fully set forth herein.

BACKGROUND OF THE INVENTION

1. Field

Exemplary embodiments of the present invention relate to a method and system for providing a representative phrase with respect to a real time popular keyword, and more particularly, to a keyword that may be displayed as a real time keyword on a web page.

2. Discussion of the Background

A popular keyword may be displayed on web pages that provide a keyword search. Popular keywords are words that were searched for or inputted into a keyword search that have rapidly risen in popularity in real time (current time). A selected popular keyword and a ranking of the popular keyword may be displayed on a web page. The popular keyword displayed on a web page may, for example, be names of celebrities, or names of international or domestic organizations, etc.

If a user desires to know the content a popular keyword may include, the user may select a predetermined popular keyword by clicking the popular keyword using a mouse, etc. and an article, a document, etc. associated with the selected popular keyword may be displayed on the web page.

It may be inconvenient for a user to select a popular keyword, and read the multiple documents associated with the selected popular keyword if the user desires to know a brief outline of the contents of the documents, such as a reason why the popular keyword is popular, etc.

There is a need for a method that may provide the reason for why a word is a popular keyword in real time without a phased selection of a popular keyword and the documents associated with the popular keyword.

The above information disclosed in this Background section is only for enhancement of understanding of the background of the invention and therefore it may contain information that does not form any part of the prior art.

SUMMARY OF THE INVENTION

Exemplary embodiments of the present invention provide a method and system for generating a representative phrase that may indicate a reason why a popular keyword is popular in real time.

Exemplary embodiments of the present invention also provide a method and system for combining a representative phrase and a popular keyword, and displaying the representative phrase on a web page.

Additional features of the invention will be set forth in the description which follows, and in part will be apparent from the description, or may be learned by practice of the invention.

An exemplary embodiment of the present invention discloses a method of providing a representative phrase, the method including generating a representative phrase with respect to a popular keyword, and providing the representative phrase by combining the popular keyword and the generated representative phrase.

An exemplary embodiment of the present invention also discloses a system for providing a representative phrase, the system including a representative phrase generator to generate a representative phrase with respect to a popular keyword, and a representative phrase provider to provide the representative phrase by combining the popular keyword and the generated representative phrase.

It is to be understood that both the foregoing general description and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 5 is a flowchart of a method of providing a representative phrase with respect to a real time popular keyword according to an exemplary embodiment.

DETAILED DESCRIPTION OF THE ILLUSTRATED EMBODIMENTS

Figure 1:
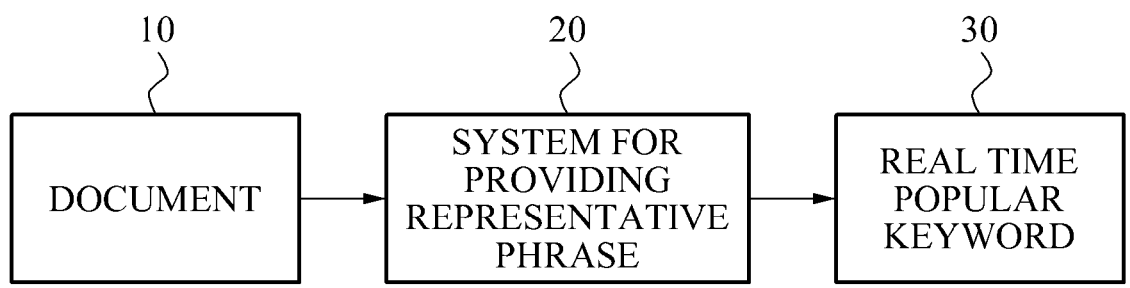
FIG. 1 is a diagram of a process of generating a representative phrase according to an exemplary embodiment.

Exemplary embodiments are described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a diagram of a process of generating a representative phrase according to an exemplary embodiment.

According to FIG. 1, a system 20 for providing a representative phrase may collect documents 10 associated with a real time popular keyword 30. Each collected document may include at least one of: text including the popular keyword, such as an article associated with the popular keyword, or a still image of the popular keyword, and combinations thereof.

The system 20 for providing a representative phrase may generate a representative phrase of the popular keyword by analyzing morphemes of words in the collected documents 10. The representative phrase of the popular keyword may refer to a phrase that may indicate a reason why a popular keyword became a real time popular keyword.

The process of generating the representative phrase of the popular keyword may be further described hereinafter with reference to FIG. 2.

Figure 2:
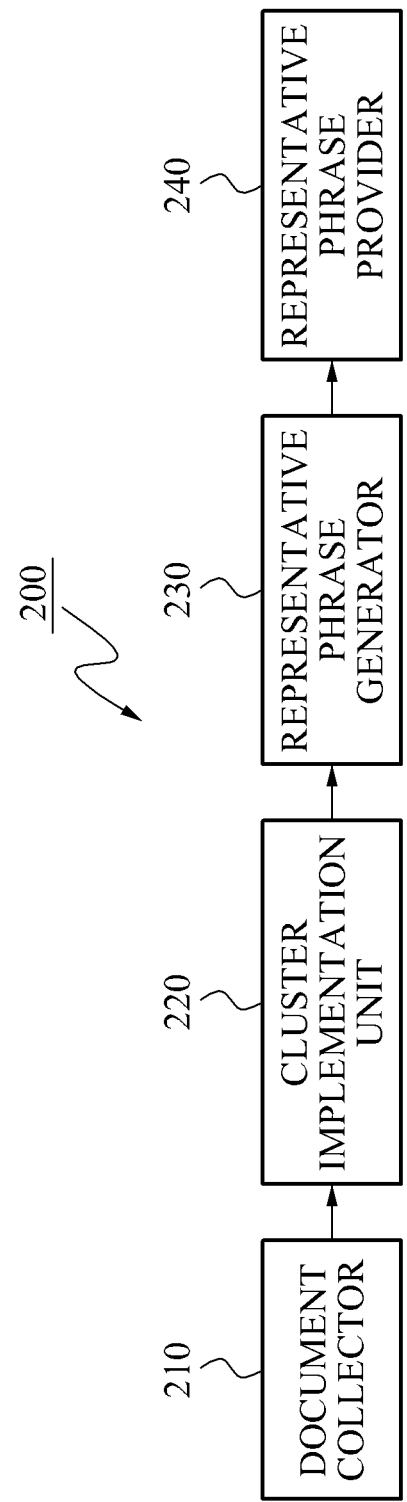
FIG. 2 is a diagram illustrating a system for providing a representative phrase according to an exemplary embodiment.

FIG. 2 is a diagram illustrating a system 200 for providing a representative phrase according to an exemplary embodiment.

Referring to FIG. 2, the system 200 for providing a representative phrase may include a document collector 210, a cluster implementation unit 220, a representative phrase generator 230, and a representative phrase provider 240.

The document collector 210 may collect, through various types of portals, and the like, documents associated with a popular keyword, that is, as documents associated with a keyword that is being input at an increasing rate in real time.

For example, the document collector 210 may collect documents with respect to a popular keyword AAA, as represented in the following Table 1.

TABLE 1

| Document | |
| --- | --- |
| NNN_news#0 | AAA, Hong Kong, top actress, secret date with 'BBB' in China? |
| NNN _news#1 | AAA, secretly dating Hong Kong actress BBB? |
| MMM _news#3 | AAA-BBB, lover? steady tremendous popularity of concert |
| MMM _news#1 | AAA, secret date with Hong Kong actress BBB? |
| LLL#0 | AAA, popularity of BBB concert video |

The cluster implementation unit 220 may gather collected documents into a cluster using N-gram morpheme analysis. The N-gram morpheme analysis may indicate using words by stringing together use up to N words. For example, 1-gram may indicate a single word, and 2-gram may indicate a form where two words may be combined in succession. The gathering of the cluster through the N-gram morpheme analysis may improve a quality of the cluster.

In the case of 1-gram morpheme analysis, an incorrect cluster may be generated; however, if a morpheme analysis is performed using up to 5-gram, a probability that documents highly associated with the keyword AAA are gathered into the cluster may increase. For example, the cluster implementation unit 220 may generate cluster input data with respect to a document NNN_news#0 of Table 1, using the 5-gram morpheme analysis. The generated cluster input data may be represented as the following Table 2.

TABLE 2

| Document | Cluster input data |
| --- | --- |
| NNN_news#0 | AAA, AAA Hong Kong, AAA Hong Kong top, AAA Hong Kong top actress, AAA Hong Kong top actress BBB, AAA with Hong Kong top actress BBB, AAA with Hong Kong top actress BBB China, Hong Kong, Hong Kong top, Hong Kong top actress, Hong Kong top actress BBB, with Hong Kong top actress BBB, with Hong Kong top actress BBB China, with Hong Kong top actress BBB in China, secret with Hong Kong top actress BBB in China, top, top actress, with top actress BBB, with top actress BBB China, with top actress BBB in China, secret with top actress BBB in China, actress, actress BBB, with actress BBB, with actress BBB China, with actress BBB in China, secret with actress BBB in China, secret date with actress BBB in China, BBB, with BBB, with BBB China, with BBB in China, secret with BBB in China, secret date with BBB in China, China, in China, secret in China, secret date in China, in, secret in, secret date in, secret, secret date, date |

Although the cluster input data generated coordinating to the document NNN_news#0 has been described in Table 2, the cluster implementation unit 220 may generate cluster input data corresponding to all of the collected documents, using N-gram morpheme analysis.

The cluster implementation unit 220 may gather documents into a cluster from among the collected documents, using the generated cluster input data and a categorical clustering technique. In an exemplary embodiment, the cluster implementation unit 220 may implement the cluster using a hierarchical clustering technique, which may be based on Jaccard coefficient. For example, the cluster implementation unit 220 may implement the cluster with respect to the collected documents of Table 1 using the hierarchical clustering technique, thereby generating two clusters as shown in the following Table 3 and Table 4.

TABLE 3

| # Cluster A | |
| --- | --- |
| MMM _news#1 | AAA, secret date with Hong Kong actress BBB? |
| NNN_news#0 | AAA, Hong Kong, top actress, secret date with 'BBB' in China? |
| NNN _news#1 | AAA, secretly dating Hong Kong actress BBB? |

TABLE 4

| # Cluster B | |
| --- | --- |
| LLL#0 | AAA, popularity of BBB concert video |
| MMM _news#3 | AAA-BBB, lover? steady tremendous popularity of concert |

In Table 3, a cluster A may correspond to a cluster including documents associated with a date of the popular keyword AAA and BBB. In Table 4, a cluster B may correspond to a cluster including documents associated with a concert of the popular keyword AAA and BBB.

The representative phrase generator 230 may generate a representative phrase corresponding to the popular keyword by combining a single sentence that may be representative of each of the clusters, from the multiple generated clusters.

Figure 3:
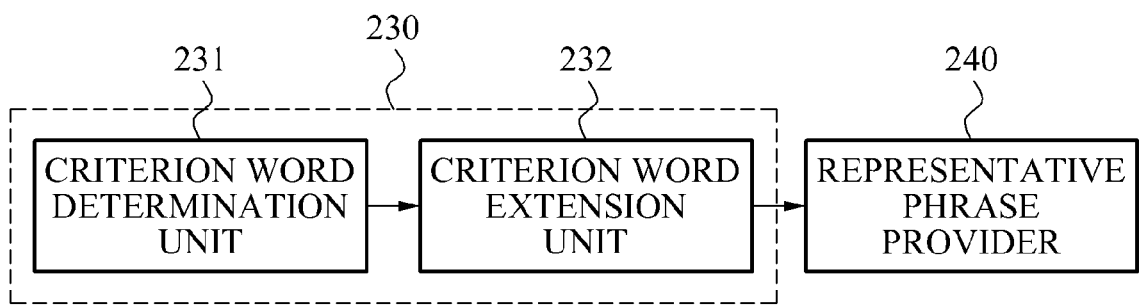
FIG. 3 is a diagram illustrating a representative phrase generator according to an exemplary embodiment.

A process of generating the representative phrase may be further described with reference to FIG. 3. FIG. 3 is a diagram illustrating a representative phrase generator according to an exemplary embodiment. The representative phrase generator 230 may include a criterion word determination unit 231 and a criterion word extension unit 232.

The criterion word determination unit 231 may determine at least one criterion word by analyzing morphemes of words in all documents included in a single cluster. For example, if morphemes of words in the documents included in the cluster A, of Table 3, are analyzed, the criterion word determination unit 231 may determine the criterion words to be "Hong Kong," "date," "BBB," "actress," "secret" and "secretly," by analyzing morphemes of words in the documents MMM_news#1, NNN_news#0, and NNN_news#1.

In an exemplary embodiment, the criterion word determination unit 231 may count the frequencies with which the determined criterion words are included in the documents MMM_news#1, NNN_news#0, and NNN_news#1. By way of example, the criterion words determined with respect to the cluster A, and the counted frequencies of the criterion words may be represented as the following Table 5.

TABLE 5

| Criterion word | Frequency |
|---|---|
| Hong Kong | 232 |
| Date | 224 |
| BBB | 215 |
| Actress | 152 |
| Secret | 142 |
| Secretly | 70 |

In an exemplary embodiment, the criterion word determination unit 231 may determine two criterion words to be representative criterion words, based on the frequency of the criterion words. In an exemplary embodiment, the criterion words with the highest frequency may be determined as the representative criterion words. By way of example, according to Table 5, the criterion word determination unit 231 may determine the top two criterion words "Hong Kong" and "date," which have the highest frequencies, as the representative criterion words. However, aspects of the present invention need not be limited thereto and the criterion words determined to be the representative criterion words may not have the highest frequency.

The criterion word extension unit 232 may calculate a conditional probability that a word in succession with the determined representative criterion words may be included in the documents included in the cluster. In an exemplary embodiment, the criterion word extension unit 232 may calculate the conditional probability that the word preceding or following the representative criterion words may be included in the documents included in the cluster using a bi-gram conditional probability.

For example, the criterion word extension unit 232 may calculate conditional probabilities that words "actress" and "top" are successive to a representative criterion word "Hong Kong" in the documents included in the cluster A of Table 3. In this instance, the criterion word extension unit 232 may calculate the conditional probability that the word "actress" follows "Hong Kong" in the documents included in the cluster A to be 2/3 using Equation 1. More particularly, documents including "Hong Kong actress" are the documents MMM_news#1 and NNN_news#1, from among the documents included in the cluster A, MMM_news#1, NNN_news#0, and NNN_news#1. Accordingly, the criterion word extension unit 232 may calculate the conditional probability of "Hong Kong actress" to be 2/3 for cluster A.

Similarly, in an exemplary embodiment, the criterion word extension unit 232 may calculate the conditional probability that the word "top" follows "Hong Kong" in the documents included in the cluster A to be 1/3. More particularly, since a single document, NNN_news#0, includes "Hong Kong top" among the documents included in the cluster A, the criterion word extension unit 232 calculates the conditional probability of "Hong Kong top" to be 1/3, using the following Equation 1.

$$P(\text{actress} | \text{Hong Kong}) = \frac{P(\text{Hong Kong actress})}{P(\text{Hong Kong})} \quad [\text{Equation 1}]$$
$$= \frac{2}{3}$$

$$P(\text{top} | \text{Hong Kong}) = \frac{P(\text{Hong Kong top})}{P(\text{Hong Kong})}$$
$$= \frac{1}{3}$$

The criterion word extension unit 232 may extend the representative criterion word to a successive word having the highest probability value from among the calculated conditional probabilities of possible combinations of the representative criterion word and successive words if the highest probability value of the representative criterion word and the successive word is greater than a predetermined criterion probability.

For example, if the predetermined criterion probability is 1/2, the criterion word extension unit 232 may select criterion words having a conditional probability greater than 1/2 by comparing the calculated conditional probabilities of the criterion words to the predetermined criterion probability, 1/2. By way of example, the criterion word extension unit 232 may compare the conditional probabilities of "Hong Kong actress" (2/3) and "Hong Kong top" (1/3) in the cluster A to the predetermined criterion probability. The criterion word extension unit 232 may determine whether the selected conditional probability is greater than the criterion probability of 1/2. Since the conditional probability of "Hong Kong actress" is 2/3, it is greater than the predetermined criterion probability of 1/2. Accordingly, the criterion word extension unit 232 may extend the representative criterion word to a word "Hong Kong actress" corresponding to the conditional probability of 2/3. In other words, the representative criterion word may be extended from "Hong Kong" to "Hong Kong actress."

In an exemplary embodiment, the criterion word extension unit 232 may continuously extend the representative criterion word until a conditional probability of a word to be extended is less than the criterion probability.

For example, the criterion word extension unit 232 may calculate a conditional probability that a word following the extended word "actress" may be included in the document included in the cluster A. The criterion word extension unit 232 may calculate a conditional probability of P (with BBB|actress) to be 1, using the same method as the foregoing Equation 1. More particularly, since the word "with BBB" following the word "actress" is included in all of the documents included in the cluster A, the criterion word extension unit 232 may calculate the conditional probability of P (with BBB|actress) to be 3/3=1. Also, since the calculated conditional probability of P (with BBB|actress) corresponding to 1 may be greater than the criterion probability of 1/2, the criterion word extension unit 232 may extend the representative criterion word from "Hong Kong actress" to "with Hong Kong actress BBB."

In an exemplary embodiment, if the conditional probability of the extended word is less than the criterion probability, the criterion word extension unit 232 may terminate the extension of the representative criterion word.

For example, if the bi-gram conditional probability is used, the criterion word extension unit 232 may terminate the extension of the representative criterion word "with Hong Kong actress BBB" of cluster A. More particularly, the document MMM_news#1 may include "secret" as a word successive to "with BBB," the document NNN_news#0 may include "in China" as the word successive to "with BBB," and the document NNN_news#1 may include "secretly" as the word successive to "with BBB." Accordingly, the criterion word extension unit 232 may calculate the conditional probabilities that the words successive "with BBB" in the cluster A to be 1/3, 1/3, and 1/3, respectively. In an exemplary embodiment, the calculated conditional probabilities may all be equal, and accordingly the criterion word extension unit 232 may select one of the conditional probabilities of 1/3 and may compare the selected conditional probability of 1/3 and the criterion probability of 1/2. Since the selected conditional probability of 1/3 is less than the criterion probability of 1/2, the criterion word extension unit 232 may terminate the extension of the representative criterion word. Accordingly, the criterion word extension unit 232 may extend the representative criterion word "Hong Kong" to "with Hong Kong actress BBB," using the bi-gram conditional probability.

In an exemplary embodiment, if the extension of the representative criterion word "Hong Kong," which has the highest frequency in cluster A, is terminated, the criterion word extension unit 232 may then extend the representative criterion word "date," which has the second highest frequency in cluster A in Table 5. The criterion word extension unit 232 may extend "date" using the bi-gram conditional probability.

For example, the criterion word extension unit 232 may calculate conditional probabilities of the words "secret" and "secretly" that may precede "date" or "dating" in the documents included in the cluster A to be 2/3 and 1/3, respectively. The criterion word extension unit 232 may select the conditional probability of "secret" (2/3), which has the greater probability value, from the calculated conditional probabilities to analyze. Since the selected conditional probability of 2/3 is greater than the criterion probability 1/2, the criterion word extension unit 232 may extend the representative criterion word to the word "secret date" corresponding to the conditional probability of 2/3.

In an exemplary embodiment, the criterion word extension unit 232 may continuously extend the representative criterion word until the bi-gram conditional probability of the extended word is less than the criterion probability. The criterion word extension unit 232 may extend the representative criterion word "date" finally to "secret date."

Also, the criterion word extension unit 232 may generate a representative phrase by combining the extended representative criterion words. For example, the criterion word extension unit 232 may generate "secret date with Hong Kong actress BBB" to be the representative phrase by combining "with Hong Kong actress BBB" and "secret date."

The representative phrase provider 240 may provide the representative phrase by combining the generated representative phrase and the popular keyword. For example, the representative phrase provider 240 may combine the generated representative phrase "secret date with Hong Kong actress BBB" and the popular keyword "AAA." In an exemplary embodiment, the combined generated representative phrase and popular keyword may be displayed on a web page.

Similarly, the criterion word determination unit 231 may determine at least one criterion word by analyzing morphemes of words in all of the documents included in the cluster B. For example, the criterion word determination unit 231 may determine "BBB," "concert," "video," "popularity," "tremendous" and "lover" to be the criterion words, by analyzing morphemes of words in the documents LLL#0 and MMM_news#3. In an exemplary embodiment, the criterion word determination unit 231 may count frequencies in which the determined criterion words may be included in the documents LLL#0 and MMM_news#3, and may determine at least two criterion words to be a representative criterion word, based on the frequency of the criterion words. In an exemplary embodiment, the representative criterion words may have the highest frequency. The criterion word extension unit 232 may calculate a conditional probability that a word in succession with the determined representative criterion word may be included in the documents included in the cluster B.

The criterion word extension unit 232 may extend the representative criterion word to a word having the greatest calculated conditional probability value from among the words in the cluster, if the word's calculated conditional probability is greater than a predetermined criterion probability. In an exemplary embodiment, the criterion word extension unit 232 may continuously extend the representative criterion word until a conditional probability of a word to be extended is less than the predetermined criterion probability. Finally, the criterion word extension unit 232 may generate a representative phrase with respect to the documents included in the cluster B by combining the extended representative criterion words.

In an exemplary embodiment, the representative phrase provider 240 may provide the representative phrase by combining the generated representative phrase and the popular keyword.

For example, the representative phrase provider 240 may respectively combine the generated representative phrases with respect to the cluster A and the cluster B with the popular keyword "AAA," and may display the representative phrases on a web page. In an exemplary embodiment, the representative phrase provider 240 may apply display priorities to the cluster A and the cluster B, and may display the representative phrase on the web page by combining the popular keyword of the representative phrase of the cluster having a higher display priority.

More particularly, in an exemplary embodiment, if a search for the popular keyword "AAA" is requested, and if the display priority of the cluster A is 80 and the display priority of the cluster B is 60, the representative phrase provider 240 may combine the representative phrase of the cluster A and the popular keyword "AAA" and may display the representative phrase on the web page. The representative phrase provider 240 may determine the display priority based on weights of the documents included in the multiple clusters. In an exemplary embodiment, the representative phrase provider 240 may determine the highest display priority to be that of a document with the highest sum of weights from among the documents included in a cluster. The representative phrase provider 240 may select the cluster having the highest display priority from the plurality of the clusters, and may combine a representative phrase of the selected cluster and the popular keyword and display the representative phrase. However, aspects of the present invention may not be limited thereto and the highest display priority need not be the assigned to the document with the highest sum of weights from among documents included in a cluster.

In an exemplary embodiment, the representative phrase provider 240 may combine a representative phrase of any one cluster of a plurality of clusters as well as a popular keyword, and may display the representative phrase on a web page, using a 'size' of the cluster. In an exemplary embodiment, the size of the cluster may correspond to a number of documents included in the cluster. In other words, the representative phrase provider 240 may combine a representative phrase of a cluster having the largest number of documents chosen between the cluster A and the cluster B as well as the popular keyword, and may display the representative phrase on the web page.

In an exemplary embodiment, the representative phrase provider 240 may calculate the size of the document by applying a weight based on a time when a document included in a cluster is prepared. The representative phrase provider 240 may apply a higher weight to a more recently prepared document. By way of example, if the cluster A has a greater number of the recently prepared documents than the cluster B, although the total number of the documents included in the cluster A may be less than the total number of the documents included in the cluster B, the size of the cluster A may be greater than the size of the cluster B. The representative phrase provider 240 may combine the representative phrase of the cluster A and the popular keyword, and may display the representative phrase.

In an exemplary embodiment, if the cluster B has a greater number of the recently prepared documents than the cluster A, although the total number of the documents included in the cluster B may be less than the total number of the documents included in the cluster A, the size of the cluster B may be greater than the size of the cluster A. The representative phrase provider 240 may combine the representative phrase of the cluster B and the popular keyword, and may display the representative phrase.

In an exemplary embodiment, the representative phrase provider 240 may display all representative phrases corresponding to popular keywords on a web page, and may also display a representative phrase of a popular keyword. In an exemplary embodiment, display of the representative phrase may be activated by using a mouse to roll over the popular keywords displayed on the web page. However, aspects of the present invention need not be limited thereto, the display of the representative phrase may be activated by touching a touch screen displaying the representative phrase, pointing a pointer to the display of the representative phrase, etc.

Figure 4:
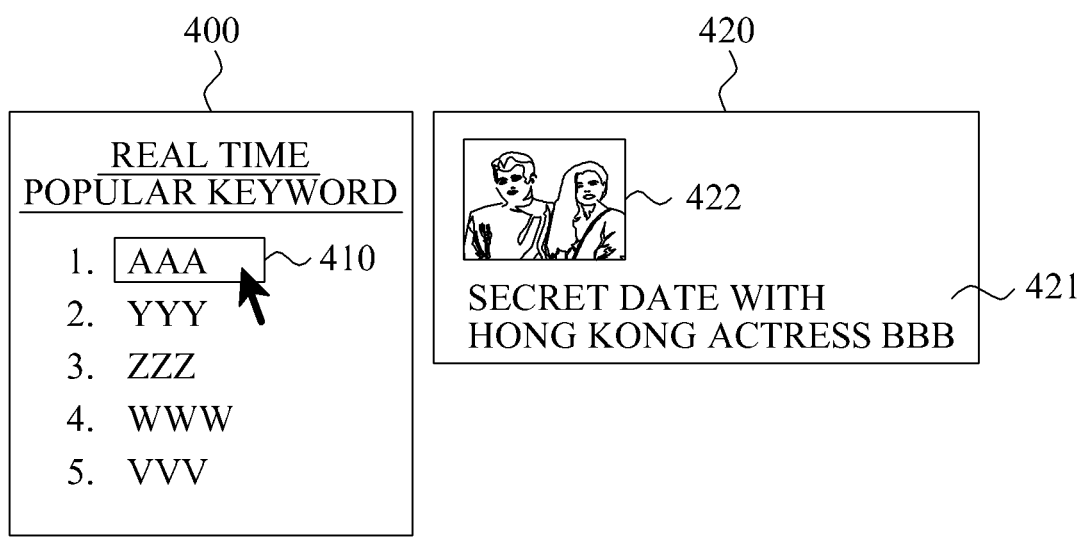
FIG. 4 is a diagram illustrating a screen where a generated representative phrase and a popular keyword may be displayed according to an exemplary embodiment.

FIG. 4 is a diagram illustrating a screen where a generated representative phrase and a popular keyword may be displayed according to an exemplary embodiment. In an exemplary embodiment, as shown in FIG. 4, when a mouse rolls over the keyword AAA 410 from a list 400 including real time popular keywords, the representative phrase provider 240 may simultaneously display the popular keyword AAA 410 and a representative phrase 421 with respect to the popular keyword AAA 410 on a web page.

In an exemplary embodiment, the representative phrase provider 240 may also display an image 420 such as a still picture, etc. with respect to the popular keyword in conjunction with the representative phrase 421 with respect to the popular keyword. The representative phrase provider 240 may apply weights to the documents based on a time when the collected documents are prepared. For example, the representative phrase provider 240 may apply a higher weight to a document if the document is more recently prepared. The representative phrase provider 240 may extract a document including a picture with respect to the popular keyword from the documents included in the cluster. The representative phrase provider 240 may combine a picture included in a document having the greatest weight among the extracted documents, with a representative phrase corresponding to the popular keyword, and the popular keyword, and may provide the combined picture, representative phrase and popular keyword.

Although the process of generating the representative phrase by extending the representative criterion words using the predetermined criterion probability has been described in the forgoing, the criterion word extension unit 232 may also calculate the criterion probability based on the following Equation 2. The criterion word extension unit 232 may extend the representative criterion word by comparing the calculated criterion probability and conditional probabilities.

$$\text{Criterion probability}_{K\_Cluster} = \frac{1}{N(K\_Cluster)^\alpha} \quad \text{[Equation 2]}$$

In Equation 2, N(K_Cluster) may denote a number of documents included in a cluster K, and α may denote a predetermined variable. For example, a real number such as 0.3, 0.4, 0.5, 0.7, and the like may be used as α.

According to Equation 2, the criterion word extension unit 232 may calculate the criterion probability based on a number of documents included in a cluster. For example, if α=0.5 and the number of documents included in the cluster A is 3, the criterion word extension unit 232 may calculate the criterion probability of the cluster A to be $$\frac{1}{3^{0.5}} = 0.577.$$

FIG. 5 is a flowchart of a method of providing a representative phrase with respect to a real time popular keyword according to an exemplary embodiment.

In operation S510, the document collector 210 may collect documents associated with a real time popular keyword through a portal, and the like.

In operation S520, the cluster implementation unit 220 may group similar documents into a cluster by analyzing morphemes of words in the collected documents.

In operation S530, the criterion word determination unit 231 may determine criterion words for each of the documents by analyzing the morphemes of the words in the documents included in the cluster. In an exemplary embodiment, the criterion word determination unit 231 may count the frequency with which the criterion words, determined through the morpheme analysis, appear in the documents of the cluster. By way of example, the criterion words and the frequencies of the criterion words, determined with respect to the documents included in the cluster A may be represented as the shown in Table 5 above.

In operation S540, the criterion word determination unit 231 may determine a representative criterion word based on the frequencies of the criterion words. By way of example, the criterion word determination unit 231 may determine two criterion words "Hong Kong" and "date" to be the representative criterion words based on Table 5, in which the words "Hong Kong" and "date" have the highest frequencies from among the criterion words determined in operation S530.

In operation S550, the criterion word extension unit 232 may calculate a conditional probability of the representative criterion word determined using a bi-gram conditional probability. In an exemplary embodiment, the conditional probability may refer to a probability that a word in succession with the representative criterion word may be included in the documents included in the cluster.

By way of example, the criterion word extension unit 232 may calculate the conditional probability that the words "actress" and "top" are in succession with a representative criterion word "Hong Kong" in the documents included in the cluster A to be 2/3 and 1/3, respectively. In an exemplary embodiment, the criterion word extension unit 232 may select the greater conditional probability of 2/3 from the calculated conditional probabilities to analyze in operation S560.

In operation S560, the criterion word extension unit 232 may determine whether the selected conditional probability is greater than a predetermined criterion probability. For example, if the predetermined criterion probability is 1/2, the criterion word extension unit 232 may determine whether the calculated conditional probability of "Hong Kong actress" corresponding to 2/3 is greater than the criterion probability of 1/2.

If the calculated conditional probability is greater than the criterion probability in operation S560, the criterion word extension unit 232 may extend the representative criterion word to the word corresponding to the selected conditional probability in operation S565. Also, in operation S565, the criterion word extension unit 232 may continuously extend the extended representative criterion word, using the same methods of operations S550 and S560. By way of example, the criterion word extension unit 232 may calculate a conditional probability that "with BBB" may follow "actress" and may extend the representative criterion word to "with BBB" by comparing the calculated conditional probability and the criterion probability.

If the calculated conditional probability is less than the criterion probability in operation S560, the criterion word extension unit 232 may terminate the extension of the representative criterion word in operation S570.

For example, the criterion word extension unit 232 may calculate conditional probabilities that a word follows the representative criterion word "with BBB" in the documents included in the cluster A. In an exemplary embodiment, all of the calculated conditional probabilities may correspond to 1/3, which may be less than the criterion probability of 1/2, and accordingly the criterion word extension unit 232 may terminate the extension of the representative criterion word. Thus, the extended representative criterion word may correspond to "with Hong Kong actress BBB."

Similarly, in an exemplary embodiment, the criterion word extension unit 232 may perform an extension with respect to the representative criterion word "date" which may be determined in operation S540, using the same method of extending "Hong Kong." The criterion word extension unit 232 may extend the representative criterion word to "secret date."

In operation S580, the criterion word extension unit 232 may generate a representative phrase by combining the extended representative criterion words. By way of example, the criterion word extension unit 232 may generate "secret date with Hong Kong actress BBB" to be the representative phrase, by combining "with Hong Kong actress BBB," which may have be extended based on the representative criterion word "Hong Kong," and "secret date," which may have be extended based on the representative criterion word "date."

In operation S590, the representative phrase provider 240 may provide the representative phrase by combining the generated representative phrase and the popular keyword. For example, the representative phrase provider 240 may display the representative phrase on the web page by combining the popular keyword "AAA" and the representative phrase "secret date with Hong Kong actress BBB," as shown in FIG. 4.

By way of example, the representative phrase provider 240 may display, on a web page, representative phrases with respect to all popular keywords included in the list 400 including real time popular keywords. In an exemplary embodiment, the representative phrase provider 240 may display only a representative phrase with respect to a popular keyword. By way of example, the display of the representative phrase may be activated by using a mouse to roll over the popular keywords.

As illustrated in FIG. 4, the representative phrase provider 240 may also display an image 420 such as a still picture, etc. with the popular keyword in conjunction with the representative phrase 421 corresponding to the popular keyword. For example, the representative phrase provider 240 may apply weights to the documents based on a time when the collected documents were prepared, and may display a picture included in a document having the highest applied weight in conjunction with the representative phrase corresponding to the popular keyword. If a picture is not included in the document having the highest weight, the representative phrase provider 240 may use a picture included in a document having the next highest weight. In an exemplary embodiment, the representative phrase provider 240 may apply a higher weight to a document when the document has been more recently prepared.

Although FIG. 5 has been described with respect to generating a representative phrase with respect to a single cluster A, and providing the representative phrase by combining the generated representative phrase of the cluster A and a popular keyword, the method of providing a representative phrase according to the exemplary embodiments of the present invention may generate representative phrases with respect to multiple clusters, and may display a representative phrase on the web page by combining at least one of the multiple generated representative phrases, and the popular keyword.

For example, the representative phrase provider 240 may respectively combine the generated representative phrases corresponding to the cluster A and the cluster B with the popular keyword "AAA" and may display the representative phrase on the web page. In an exemplary embodiment, the representative phrase provider 240 may apply display priorities to the cluster A and the cluster B and may display the representative phrase on the web page by combining the popular keyword of the representative phrase of the cluster having a higher display priority.

In an exemplary embodiment, if a search for the popular keyword "AAA" is requested and if the display priority of the cluster A is 80 and the display priority of the cluster B is 60, the representative phrase provider 240 may combine the representative phrase of the cluster A and the popular keyword "AAA," and may display the representative phrase on the web page. The representative phrase provider 240 may determine the display priority based on weights of the documents included in the multiple clusters. In an exemplary embodiment, the representative phrase provider 240 may determine the highest display priority to be that of the a document with the highest sum of weights from among the documents included in a cluster. The representative phrase provider 240 may select the cluster having the highest display priority from the plurality of the clusters, and may combine a representative phrase of the selected cluster and the popular keyword and display the representative phrase. However aspects of the present invention may not be limited thereto, and the highest display priority need not be the assigned to the document with the highest sum of weights from among documents included in a cluster.

In an exemplary embodiment, the representative phrase provider 240 may combine a representative phrase of any one cluster of a plurality of clusters, and a popular keyword, and may display the representative phrase on a web page, using a size of the cluster. In an exemplary embodiment, the size of the cluster may correspond to a number of documents included in the cluster. In other words, the representative phrase provider 240 may combine a representative phrase of a cluster, having the largest number of documents chosen between the cluster A and the cluster B, and the popular keyword, and may display the representative phrase on the web page.

In an exemplary embodiment, the representative phrase provider 240 may also calculate the size of the document by applying a weight based on a time when a document included in a cluster is prepared. The representative phrase provider 240 may apply a higher weight to a more recently prepared document. By way of example, if the cluster A has a greater number of the recently prepared documents than the cluster B, although the total number of the documents included in the cluster A may be less than the total number of the documents included in the cluster B, the size of the cluster A may be greater than the size of the cluster B. The representative phrase provider 240 may combine the representative phrase of the cluster A and the popular keyword, and may display the representative phrase.

In an exemplary embodiment, if the cluster B has a greater number of the recently prepared documents than the cluster A, although the total number of the documents included in the cluster B may be less than the total number of the documents included in the cluster A, the size of the cluster B may be greater than the size of the cluster A. The representative phrase provider 240 may combine the representative phrase of the cluster B and the popular keyword, and may display the representative phrase.

The aforementioned embodiments have been described in relation to a method which may determine two representative criterion words having the highest frequency among a plurality of criterion words, may extend the representative criterion words based on conditional probabilities, and may generate the representative phrase. However, the aspects of the present invention need not be limited thereto, the criterion word determination unit 231 may determine any number of words as representative criterion word based on frequency among the plurality of the criterion words, and the criterion word extension unit 232 may generate the representative phrase by extending the determined representative criterion word.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

According to embodiments of the present invention, a representative phrase, that may indicate a reason why a popular keyword is popular, may be generated and displayed in real time (current time).

According to embodiments of the present invention, a representative phrase may be displayed on a web page, by combining the representative phrase and a popular keyword.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method that uses a processor to provide a representative phrase, the method comprising:
    generating, using the processor, a representative phrase corresponding to a popular keyword, the popular keyword being a keyword that was inputted into a website and is determined to be popular based on a real-time input frequency of the keyword into the website,
    the generating includes,
        collecting documents containing the popular keyword from a plurality of websites,
        grouping the collected documents containing the popular keyword into a plurality of clusters,
        determining criterion words from at least one of the content clusters by analyzing morphemes of words in a plurality of documents for each of the plurality of content clusters,
        determining a representative criterion word from among the determined criterion words, the representative criterion word being based on a frequency at which the determined criterion words are included for each of the plurality of clusters, the determining the representative criterion word includes continuously extending the representative criterion word until a conditional probability of a word to be included in the extended representative criterion word is less than a desired criterion probability,
        calculating a conditional probability that a word preceding or following the representative criterion word in at least one of the plurality of documents is contained for each of the plurality of clusters that contains the popular keyword, and
        generating the representative phrase for each of the plurality of clusters corresponding to the popular word by combining the word preceding or following the determined representative criterion word with the determined representative criterion word when the calculated conditional probability is greater than a desired conditional probability; and
    providing, via the processor, to the website for display the representative phrase from the plurality of representative phrases generated from the plurality of clusters based on a priority of the plurality of clusters, by combining the popular keyword and the generated phrase in response to user activity in association with the website, wherein the user activity includes user interaction with a Graphical User Interface (GUI) element with respect to the popular keyword based on user input into a device.

2. The method of claim 1, wherein the continuously extending comprises:
    extending the representative criterion word by combining a word preceding or following the determined representative criterion word with the determined representative criterion word.

3. The method of claim 2, wherein the continuously extending the representative criterion word comprises:
    extending the representative criterion word to include another word based on a calculated condition probability of the other word and based on the calculated conditional probability of the word to be included in the extended representative criterion word.

4. The method of claim 2, wherein calculating a conditional probability is based on at least two documents containing the popular keyword.

5. The method of claim 3, wherein the extending of the representative criterion word further comprises:
    calculating the desired criterion probability based on a number of the documents; and
    the extending the extended representative criterion word includes extending the extended representative criterion word if the calculated conditional probability is greater than the criterion probability.

6. The method of claim 2, wherein the determining of the representative criterion word comprises:
   counting a frequency of the criterion words by analyzing morphemes of words in the document containing the popular keyword; and
   determining the representative criterion word based on the counted frequencies of the criterion words.

7. The method of claim 6, wherein an $N^{th}$ determined representative criterion word has the $N^{th}$ highest frequency from among the frequencies of the criterion words in the document containing the popular keyword.

8. The method of claim 1, wherein the documents containing the popular keyword are grouped based on N-gram morpheme analysis.

9. The method of claim 1, wherein generating of the extending a representative criterion word based on the documents containing the popular keyword included in at least one of the plurality of clusters.

10. The method of claim 1, further comprising:
    applying a weight to the collected documents containing the popular keyword based on the order the document was collected.

11. The method of claim 10, further comprising:
    determining a display priority of the cluster based on the applied weight,
    wherein the providing the representative phrase by combining the popular keyword and the generated phrase includes combining a representative phrase of the cluster selected based on the determined display priority with the popular keyword.

12. The method of claim 1, wherein the documents comprise:
    at least one of a text comprising the popular keyword, a still image of the popular keyword, and combinations thereof.

13. A non-transitory computer-readable medium having stored thereon computer readable instructions which when executed by a processor, configures the processor to:
    generate, via the processor, a representative phrase corresponding to a popular keyword, the popular keyword being a keyword that was inputted into the a website and is determined to be popular based on a real-time input frequency of the keyword into the website,
    in the generating, the processor is configured to,
        collect documents containing the popular keyword from a plurality of websites,
        group the collected documents containing the popular keyword into a plurality of clusters,
        determine criterion words from at least one of the content clusters by analyzing morphemes of words in a plurality of documents for each of the plurality of content clusters,
        determine a representative criterion word from among the determined criterion words, the representative criterion word being based on a frequency at which the determined criterion words are included for each of the plurality of clusters, determining the representative criterion word, the processor is configured to continuously extend the representative criterion word until a conditional probability of a word to be included in the extended representative criterion word is less than a desired criterion probability, and
        calculate a conditional probability that a word preceding or following the representative criterion word in at least one of the plurality of documents is contained for each of the plurality of clusters that contains the popular keyword, and
        generate the representative phrase for each of the plurality of clusters corresponding to the popular word by combining a word preceding or following the determined representative criterion word with the determined representative criterion word when the calculated conditional probability is greater than a desired conditional probability; and
    provide to the website for display the representative phrase from the plurality of representative phrases generated from the plurality of clusters based on a priority of the plurality of clusters, by combining the popular keyword and the generated representative phrase in response to user activity in association with the website, wherein the user activity includes user interaction with a Graphical User Interface (GUI) element with respect to the popular keyword based on user input into a device.

14. A system for providing a representative phrase, the system comprising:
    a memory having computer readable instructions stored thereon; and
    at least one processor configured to execute the computer readable instructions to,
    generate, a representative phrase corresponding to a popular keyword the popular keyword being a keyword that was inputted into a website and is determined to be popular based on a real-time input frequency of the keyword into the website,
    the generation includes,
        collect documents containing the popular keyword from a plurality of websites,
        group the collected documents containing the popular keyword into a plurality of clusters,
        determine criterion words from at least one of the content clusters by analyzing morphemes of words in a plurality of documents for each of the plurality of content clusters,
        determine a representative criterion word from among the determined criterion words, the representative criterion word being based on a frequency at which the determined criterion words are included for each of the plurality of clusters, the determination includes continuously extend the representative criterion word until a conditional probability of a word to be included in the extended representative criterion word is less than a desired criterion probability,
        calculate a conditional probability that a word preceding or following the representative criterion word in at least one of the plurality of documents is contained for each of the plurality of clusters that contains the popular keyword, and
        generate the representative phrase for each of the plurality of clusters corresponding to the popular word by combining a word preceding or following the determined representative criterion word with the determined representative criterion word when the calculated conditional probability is greater than a desired conditional probability; and
    provide to the website for display the representative phrase from the plurality of representative phrases generated from the plurality of clusters based on a priority of the plurality of clusters by combining the popular keyword and the generated phrase in response to user activity in association with the website, wherein the user activity includes user interaction with a Graphical User Interface (GUI) element with respect to the popular keyword based on user input into a device.

15. The system of claim 14, wherein the at least one processor is further configured to:
   determine the criterion words by analyzing morphemes of words in a document containing the popular keyword;
   determine a representative criterion word based on a frequency of the determined criterion word;
   extend the representative criterion word by combining a word in succession with the determined representative criterion word and the determined representative criterion word; and
   generate the representative phrase using the extended representative criterion word.

16. The system of claim 15, wherein the at least one processor is further configured to:
   extend the representative criterion word to include another word based on a calculated condition probability of the other word and based on the calculated conditional probability of the word to be included in the extended representative criterion word.

17. The system of claim 16, wherein the at least one processor is further configured to:
   calculate the desired criterion probability; and
   extend the extended representative criterion word if the calculated conditional probability is greater than the calculated criterion probability.

18. The system of claim 15, wherein the at least one processor is further configured to:
   count a frequency of the criterion words by analyzing morphemes of words in a document containing the popular keyword; and
   determine the representative criterion word.

19. The system of claim 14, wherein the at least one processor is further configured to:
   gather the collected documents based on N-gram morpheme analysis.

20. The system of claim 19, wherein the minimum N value in the N-gram morpheme analysis is 2.

21. The system of claim 20, wherein the at least one processor is further configured to:
   generate the representative phrase by extending a representative criterion word based on documents of the cluster.

22. The system of claim 14, wherein the at least one processor is further configured to:
   apply a weight to the collected documents based on the order the documents were collected.

* * * * *